United States Patent
Kneece

(10) Patent No.: US 9,892,374 B2
(45) Date of Patent: Feb. 13, 2018

(54) SYSTEM FOR VIRTUAL EVENT PLANNING

(71) Applicant: Mark C. Kneece, Iselin, NJ (US)

(72) Inventor: Mark C. Kneece, Iselin, NJ (US)

( * ) Notice: Subject to any disclaimer, the term of this patent is extended or adjusted under 35 U.S.C. 154(b) by 101 days.

(21) Appl. No.: 14/845,933

(22) Filed: Sep. 4, 2015

(65) Prior Publication Data

US 2016/0148138 A1 May 26, 2016

Related U.S. Application Data

(63) Continuation-in-part of application No. 14/736,338, filed on Jun. 11, 2015, now abandoned.

(60) Provisional application No. 62/084,301, filed on Nov. 25, 2014.

(51) Int. Cl.
*G06F 3/048* (2013.01)
*G06Q 10/06* (2012.01)
*G06Q 50/00* (2012.01)

(52) U.S. Cl.
CPC ....... *G06Q 10/06313* (2013.01); *G06Q 50/01* (2013.01)

(58) Field of Classification Search
CPC .......................... G06F 3/04847; G06F 3/0484
See application file for complete search history.

(56) References Cited

U.S. PATENT DOCUMENTS

| | | | | |
|---|---|---|---|---|
| 2009/0150489 A1* | 6/2009 | Davis | ............... | G06Q 10/107 709/204 |
| 2009/0319306 A1* | 12/2009 | Chanick | ............ | G01C 21/3679 705/5 |
| 2012/0004956 A1* | 1/2012 | Huston | ............. | G06Q 30/0207 705/14.1 |
| 2013/0215116 A1* | 8/2013 | Siddique | ........... | G06Q 30/0643 345/420 |
| 2013/0275869 A1* | 10/2013 | Haswell | ................ | G06F 3/048 715/706 |
| 2013/0298053 A1* | 11/2013 | Sprang | ................. | G06F 3/0484 715/765 |
| 2014/0046829 A1* | 2/2014 | Serban | ................ | G06Q 20/123 705/39 |
| 2014/0123014 A1* | 5/2014 | Keen | ................... | H04L 12/1831 715/719 |
| 2015/0350266 A1* | 12/2015 | O'Brien | ............... | H04L 65/403 709/204 |
| 2016/0042648 A1* | 2/2016 | Kothuri | .................. | G06F 3/015 434/236 |

* cited by examiner

Primary Examiner — William Bashore
Assistant Examiner — Rayeez Chowdhury
(74) Attorney, Agent, or Firm — Dunlap Bennett & Ludwig PLLC

(57) ABSTRACT

A system for virtual event planning is disclosed. The system comprises a processor and memory that further includes computer-executable instructions that, when executed by the processor, cause the processor to implement a user interface module for generating and/or accessing a virtual event, a virtual production facility for virtually customizing and displaying the contribution of one or more contributors and/or participants of the virtual event, and an interaction module for providing user controlled interaction between the one or more contributors and/or participants.

7 Claims, 4 Drawing Sheets

SYSTEM FOR VIRTUAL EVENT PLANNING

CROSS-REFERENCE TO RELATED APPLICATIONS

This application claims the benefit of priority of U.S. provisional application No. 62/084,301, filed Nov. 25, 2014, and is a continuation in part to U.S. non-provisional application Ser. No. 14/736,338, filed Jun. 11, 2015, the contents of which are herein incorporated by reference.

FIELD OF INVENTION

The present invention relates to a system and a method for virtual event management. More specifically, the present invention is related to a system and a method facilitating live event planning and streaming production.

BACKGROUND OF THE INVENTION

Event planning is the creation and development of large scale events such as festivals, conferences, ceremonies, formal parties, concerts etc. It involves researching about the event, identifying the target audience, planning the logistics, vendor services and coordinating the technical aspects before launching the event in real-time. Typically, an event planner works with clients from the initial level such as budgeting, selecting the venue, scheduling and making all the arrangements, acquiring necessary permits, coordinating transportation and parking, arranging for speakers or entertainers, arranging decor, event security, catering and emergency plans at the selected venue until the completion of the event. Thus, the event planner has to coordinate activities with the client, contributors and participants of the event.

Virtual Event planning is web-based event planning service that is currently in trend and an effective way of executing events in a time and cost effective way. The major advantage of the virtual event planning is that the virtual events can easily be customized and visualized with the selected list of contributors and participants over the Internet, both in real time and on-demand.

For example, a school may create a virtual annual function event in which students as participants perform cultural activities, speeches, prize distribution and a corporate firm may design a virtual event introducing new scheme and policies of the company.

Presently, there is no such system which can facilitate all such services as a standalone system. There are few publically available websites for planning events over the internet such as www.meetingpros.com. However, they do not facilitate real-time customization of contributors (vendors and service provides) and also are ineffective in providing real-time control/access to the selected participants over the event. Moreover, there is no system that can provide real-time video streaming to the attending and non-attending participants of the event.

Hence, in the light of aforementioned, it is required to devise a system and a method that overcomes the limitations of the prior art in an effective manner.

SUMMARY OF THE INVENTION

One aspect of the present invention is a system for virtual event planning. The system for virtual event planning comprises: a processor; and memory comprising computer-executable instructions that, when executed by the processor, cause the processor to implement: a user interface module for generating and/or accessing a virtual event; a virtual production facility for virtually customizing and displaying the contribution of one or more contributors and/or participants of the virtual event, and an interaction module for providing user controlled interaction between the one or more contributors and/or participants.

Another aspect of the present invention is a method that comprises the steps of: inputting plan details of an event through a user interface; reserving and communicating event details to, and designating a production facility as venue for event; selecting and customizing contribution of one or more contributors and/or participants of the event, and streaming the production to the selected participants, either for free or for a fee, as determined by the client.

Another aspect of the present invention is a computer program product for virtual event planning. The computer program product comprises at least one non-transitory computer-readable storage medium having computer-readable program code portions stored therein, said computer-readable program code portions comprising instructions for: inputting plan details of an event through a user interface; reserving and communicating event details to, and designating a production facility as a venue for event; selecting and customizing contribution of one or more contributors and/or participants of the event, and streaming the production to the selected participants, either for free or for a fee, as determined by the client.

It is an object of the present invention to provide through the user controlled interaction provided by the interaction module for the user to differentiate the level of access that the one or more contributors and/or participants have via their electronic device, websites and/or phone applications such that the selected participants see and hear the performer in real time; the selected participants interact with the performer in real time; the selected participants interact with other selected participants preferably having same and/or higher level of access in real time, and the selected participants control the technical direction of the performance such as camera work, special effects, affecting how they themselves experience the event on real time.

Some or all aforementioned advantages of the invention are accrued by the Production Facility (either internal or external) that itself becomes the Venue of the event, and so clients are able to enjoy customized all-encompassing professional quality productions of events that combine traditional event planning, Virtual Settings, Sight, Sound, Special Effects, Live Action, and Personal, Web, Streaming with Pod, and Phone App Interaction.

This invention is pointed out with particularity to the appended claims. Additional features and advantages of the system will become apparent to those skilled in the art by referring to the following detailed description taken in conjunction with the accompanying drawings

BRIEF DESCRIPTION OF DRAWINGS

The features of the present invention, which are believed to be novel, are set forth with particularity in the appended claims. The invention may best be understood by reference to the following description, taken in conjunction with the accompanying figures. Whenever possible, the same reference numerals will be used throughout the drawings to refer to the same or like parts. These figures and the associated description are provided to illustrate some embodiments of the present invention, and not to limit the scope of the invention.

DETAILED DESCRIPTION OF THE PREFERRED EMBODIMENTS

The following detailed description is merely exemplary in nature and is to enable any person skilled in the art to make and use the invention. The examples shown in description are not intended to limit the application and uses of the various embodiments. Various modifications to the disclosed invention will be readily apparent to those skilled in the art, and the methodology defined herein may be applied to other embodiments and applications without departing from the spirit and scope of the present disclosure. Thus, present invention is not limited to the examples discussed below, but is to be accorded the widest scope consistent with the methodology and features disclosed herein. It should also be noted that FIGS. 1-4 are merely illustrative and may not be drawn to scale.

The exemplary methods described below are typically stored on a computer-readable storage medium, which may be any device that can store code for use by a computer system, mobile and others. The computer-readable storage medium includes, but is not limited to volatile memory, non-volatile memory, magnetic and optical storage devices such as disk drives, magnetic tape, CDs (compact discs), DVDs (digital versatile discs or digital video discs), or other media capable of storing code now known or later developed.

Furthermore, methods described herein can be embossed on hardware modules or apparatus. These modules or device may include, but are not limited to, an application-specific integrated circuit (ASIC) chip, a field-programmable gate array (FPGA), a dedicated or shared processor that executes a particular software module or a piece of code at a particular time, and/or other programmable-logic devices known or later developed. When the hardware modules or apparatus are activated, they perform the methods and processes included within them.

Figure 1:
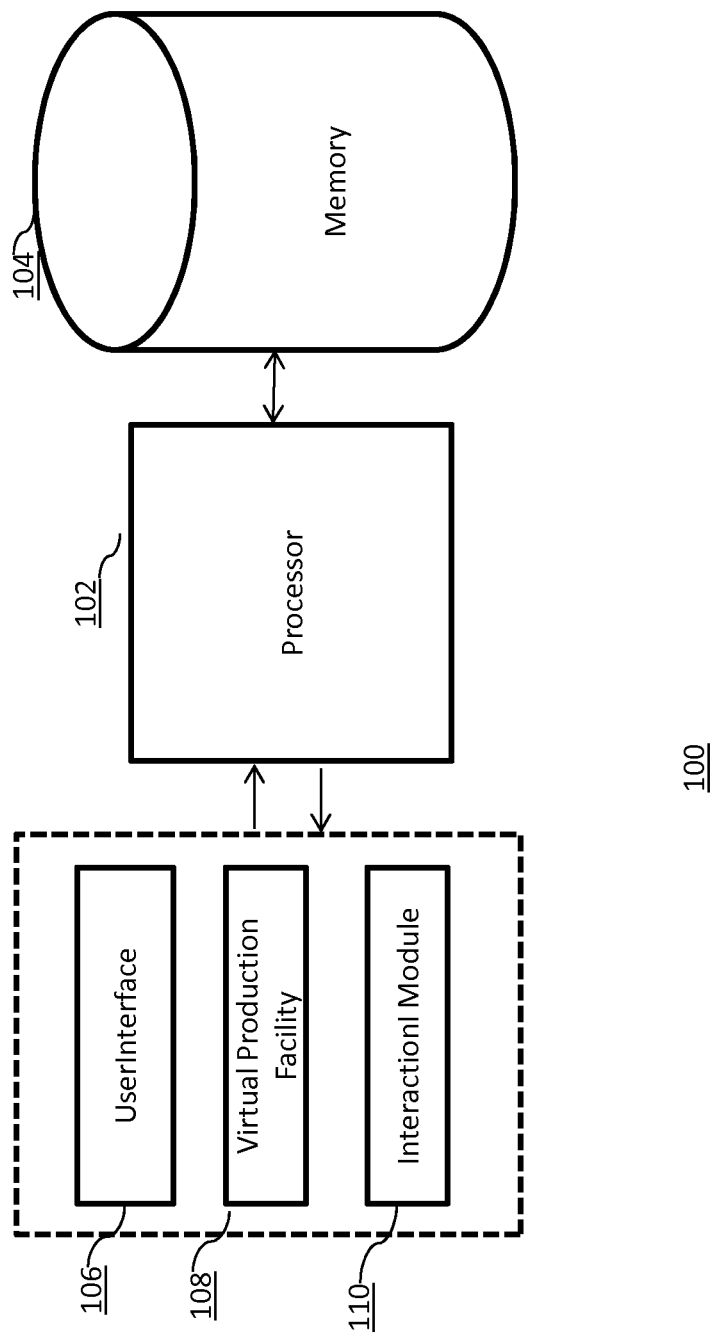
FIG. 1 is a block diagram of the system for virtual event planning in accordance with an embodiment of the present invention.

Referring to FIG. 1, an embodiment of the present invention discloses a system 100 for virtual event planning. The system 100 includes a processor 102 and memory 104. The memory 104 comprises computer-executable instructions that, when executed by the processor 102, cause the processor 102 to implement: a user interface module 106 for generating and/or accessing a virtual event; a virtual production facility 108 for virtually customizing and displaying the contribution of one or more contributors and/or participants of the virtual event, and an interaction module 110 for providing user controlled interaction between the one or more contributors and/or participants.

In an embodiment of the present invention, the user interface module 106 takes inputs from the user such as a date, time, venue, location, budget, packages for effects, cuisine and other event related matters. Further, the user interface module 106 displays event plan details to the user such as choices of venue, location, availability of venue, cost, suitable packages, available service on date and location.

In another embodiment of the present invention, the one or more contributors include performers, vendors, service providers such as event location managers, caterers, camera/video recording providers, audio/music system providers, decorators, drivers and other staff.

In another embodiment of the present invention, the interaction module 110 is enabled to provide one or more medium such as tele-conferencing, webcasting, voice, video and other medium of interaction to the one or more contributors and/or participants.

In an embodiment of the present invention, the virtual production facility 108 provides the production of the virtual event either fully or in partial such that the event is virtually displayed on real location, a computer generated location, a camera captured location or a live stage with the potentially unlimited audience following on their electronic devices.

Figure 2:
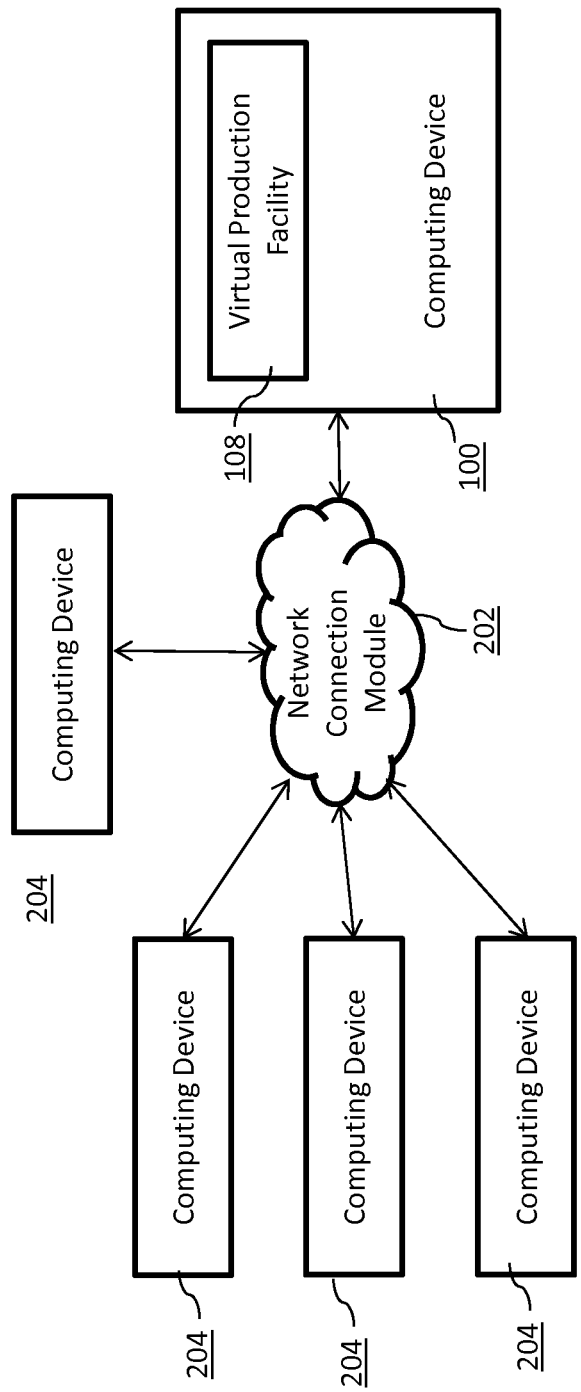
FIG. 2 is a block diagram of the system for virtual event planning in accordance with another embodiment of the present invention.

Referring to FIG. 2 in an embodiment of the present invention, the system 100 for virtual event planning further includes a network connection module 202. The network connection module 202 works with the interaction module 110 to establish connection between the system 100 (system of event planner) and the other computing devices 204 (of contributors and/or participants). The network connection module is further configured for performing the following functions: providing a tour of a event location to a user through the user interface 106; providing conferencing between one or more contributors of the virtual event; interfacing with a local tourism authority system; interfacing a real traveler positioned at the event location with a virtual traveler positioned at a remote location; interfacing with a travel agent system to determine a guide for the event location; reserving/booking the contributors and event venue; interfacing with other systems for virtual and/or real-time event planning, and transmitting the event recording/listings to other participant such as the virtual audience, remote audience and non-attending guests.

In an embodiment of the present invention, the system 100 through the user controlled interaction provided by the interaction module 110, the user is allowed to differentiate the level of access that the one or more contributors and/or participants have via their electronic device, websites and/or phone applications such that the selected participants see and hear the performer in real time; the selected participants interact with the performer in real time; the selected participants interact with other selected participants preferably having the same and/or higher level of access in real time, and the selected participants control the technical direction of performance such as camera work, special effects, and affecting how they themselves experience the event in real time.

In some embodiments of the present invention, the system 100 further includes a payment processing module to collect payments from participants of the virtual event and to distribute payments to one or more event planners and the contributors.

Figure 3:
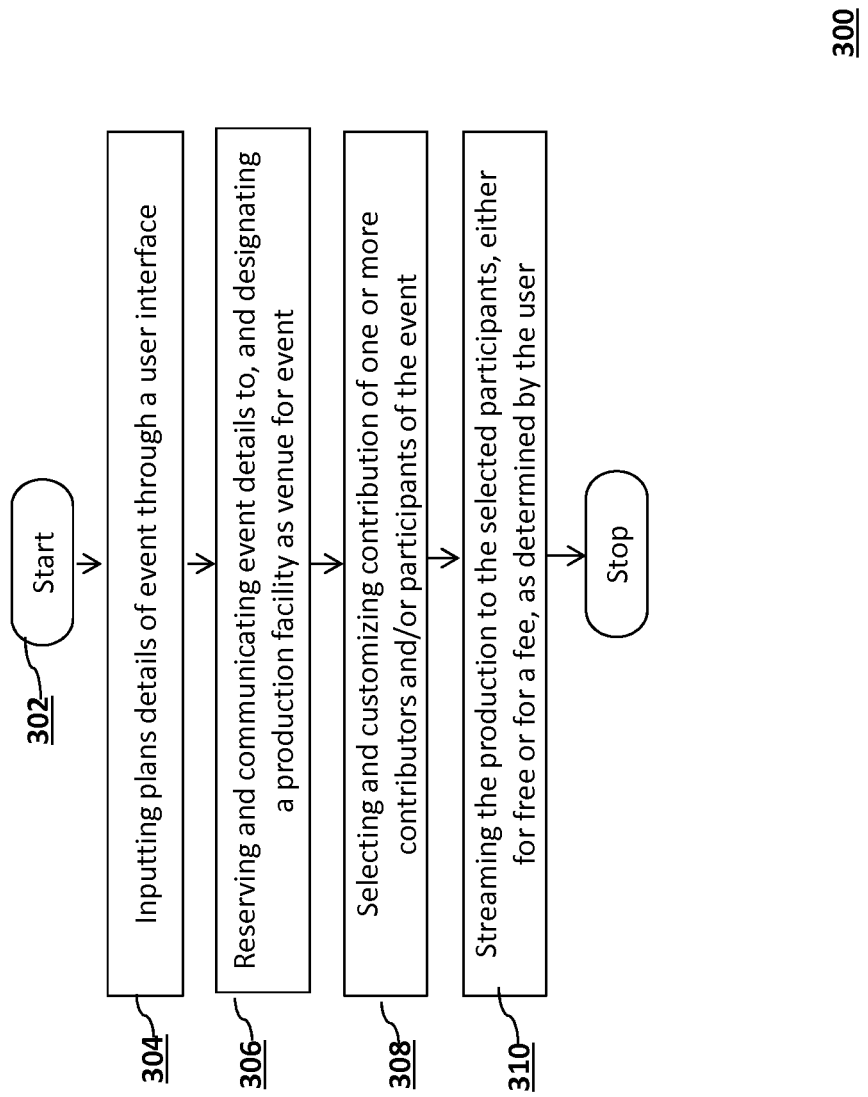
FIG. 3 demonstrates a flow-diagram representing a method for virtual event planning in accordance with another embodiment of the present invention.

Referring to FIG. 3, an embodiment of the present invention provides a method 300 for virtual event planning. The method 300 starts at step 302. At step 304, the user inputs plans details of the event through the user interface 106. Further, at step 306, the user can reserve and communicate event details to, and can designate a production facility as a venue for event. In the next step 308, contributors and/or participants of the event can be selected and the user can customize contribution of one or more contributors and participants. In a further step 310, the virtual event is generated and the production can be streamlined to the selected list of participants. The streaming of the production can be either for free or for a fee, as determined by the user.

The method 300 is implementable on a computing device. The computing device can be any device such as computer system, mobile, laptop, tablets etc. The method can be performed in any computing device in the form of computer program or virtual event planning application.

Figure 4:
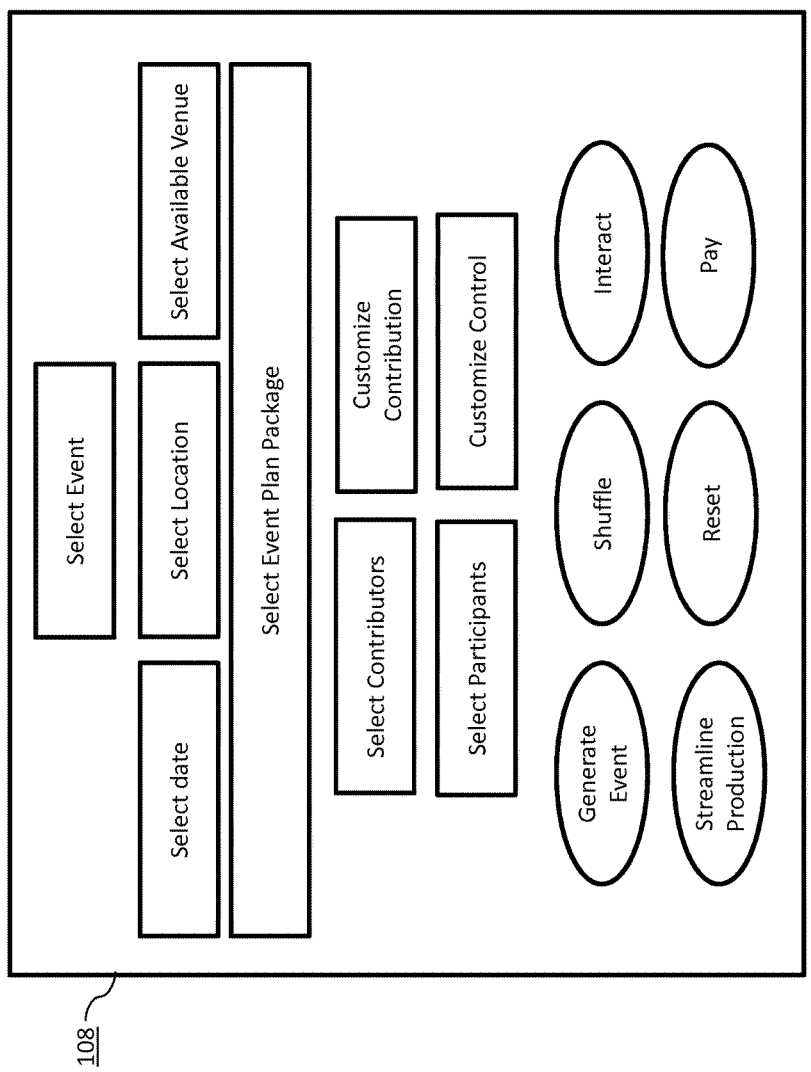
FIG. 4 demonstrates a schematic of a virtual production facility in accordance with an embodiment of the present invention.

Referring to FIG. 4, in an embodiment of the invention, the virtual production facility 108 can be reached through the user interface module 106. In the virtual production facility 108, the user can either select the event from the already preloaded list of events in the memory 104 or can enter the event details. The user may select the date, location, and available venue. The user may further select the packages for the event planning such as planning before 6 months, planning before 3 months, planning before 1 month, last minute planning of event etc.

As per the package chosen, the user may further choose the contributors and can customize the contribution. For example, the user may choose a flower decorator and can book him for the decoration with white lilies in the marriage hall. The user may further select the list of participants, attending participants and/or non-attending participants, of the event. The user may customize the control of the participant over the event as discussed above.

The user can generate the event and streamline the production with the selected list of participants. The user and/or participants can interact with the contributors and other participants. The selected participants can shuffle and/or reset the event as per their choice. Further the user can pay for the contribution of contributors and/or set the advance payment.

In an exemplary embodiment of the present invention, the user can optimize, simplify, minimize, and/or eliminate the step of wedding events from the virtual production facility 108. The user may choose the Advance Planning: About a Year Before The Wedding:
1. budgeting for the event
2. setting for the location and theme of the event
3. compiling a guest list
4. choosing how wedding party will be
5. setting dates for the event
6. finding venues for the rehearsal, dinner, ceremony, and reception
7. finding attire for the bride and groom
8. start looking for contributors (vendors and/or service providers)
9. consider hiring a wedding planner
10. planning for honeymoon; location, dates and package selection etc.
11. reserving hotel blocs for out-of-town guests.

The user may choose the Concrete Planning: At Least 6 Months In Advance:
1. booking contributors (florists, photographers, caterers, venues, cake designers, entertainment etc.)
2. deciding on a style (color scheme, decorations, atmosphere etc.)
3. planning a mean for invitation (purchasing wedding invitation cards)
4. creating gift registries
5. sending out save-the-date cards
6. establishing participants and customizing control of them (who is in your wedding party and who's involved in the wedding ceremony)
7. booking transportation
8. planning bachelor and bachelorette parties, bridal shower, etc.

The user may choose the Concrete Planning: 3 Months In Advance:
1. finalizing venue and vendor bookings
2. checking for attires fitting
3. reserving party linens and decorations
4. finalizing guest list and sending out invitations
5. deciding on ceremony order and content
6. purchasing wedding rings
7. Finalizing honeymoon plans.

The user may choose the It's Coming Up Quickly: 6-8 Weeks in Advance:
1. touching base with contributors (vendors and venue manager)
2. checking for attires fitting
3. taking dance lessons
4. sending rehearsal dinner invitations
5. finalizing any leftover vendors
6. creating a timeline for the rehearsal dinner and reception.

The user may choose the Last-Minute Items: 0-5 Weeks In Advance:
1. obtaining a marriage license
2. adhering to any old traditions
3. purchasing the little things
4. printing ceremony bulletins
5. confirming RSVP list and create seating arrangements
6. touching base with wedding party and anyone else involved
7. having final dress and tux fittings
8. giving vendors final guest counts
9. packing for the big day and honeymoon
10. making hair appointments and other beauty appointments
11. completing any leftover final payments
12. give out wedding party gifts
13. trying to relax and enjoying the wedding week
14. planning for a clean-up crew after the wedding.

The user may choose the: After the Honeymoon:
1. writing and sending thank you cards
2. having the wedding dress cleaned
3. touching base with the photographer
4. completing your registry.

In another exemplary embodiment of the present invention, the user may plan children's holiday play at a church. In the prior art, this production would be limited by the size of the available church space, the feasibility of building sets and the number of churchgoers available to physically be present in the event. With the system 100 for virtual event planning, the user can create any virtual setting and special effects for this play/pageant as per his choice, and make it available/share to whomever, wherever, and whenever he wishes, including those who may not be able to attend personally. Further, he may have a permanent record of event production and can streamline with others.

In a further exemplary embodiment of the present invention, the user may plan the performance event (i.e. act, singing/music event, comedy event etc.) in which he wishes to perform live.

In a further exemplary embodiment of the present invention, a play writer may plan to produce an original play/film, etc.

In general, the user chooses the venue for the event with budget and duration planning. The user further contacts the venue manager for bookings and checking details. The user also checks the size of venue as per the participant's count.

Further, the user checks when the user can load-in and sound check, when the door should be opened, when does the show need to end, what do contributors provide technically, are there any special rules. The user further makes negotiations, finds the best deal and signs a contract.

With the present system 100, the user is allowed to choose the venue with the computing device having the virtual event planning application (computer program). The user gets the full freedom and control over the all elements (including contributors and services) of that venue, and their performance. He can choose the performance date, contact the venue, negotiate a price and can sign a contract by using the virtual event planning application. The present invention also enables the user to charge a fee from the participants (audience) via a dedicated website/phone App. Thus, with the present invention, the user can create the production (either fully or partially), just as it would be on a live stage, with the potentially unlimited audience following on their devices (PC's, Phones, etc.).

In certain embodiments, members of the streaming audience may have the option to create a custom virtual album of the event. In such embodiments, the streaming audience has the option to capture stills of the streaming event, as well as record video or audio of a portion of the streaming event. The audience members may arrange the stills and the recorded video/audio on a template to create the virtual album. In certain embodiments, the video/audio may be recorded on a compact disc, an album cover may be printed using stills from the streaming event, and a physical album from the streaming event may be created and sold.

In certain embodiments of the present invention, members of the streaming audience may interact with the performers. For example, an audio icon may be created by the audience member. The audio icon may include the audience member's unique recording of a sound sample of their own choosing. The audience member may thereby identify themeselves and communicate with the performers, such as approving or disapproving of the performance. This audio icon may be sent to the performer via email, text, chatroom, or the like. In certain embodiments, the audio icons may be converted to a synthesized voice to communicate with the performer. In such embodiments, the audience member may have their text, email, or chatroom communications converted into the synthesized voices which is played to the performer.

A further embodiment of the present invention provides a computer program product for virtual event planning, the computer program product comprising at least one non-transitory computer-readable storage medium having computer-readable program code portions stored therein, said computer-readable program code portions comprising instructions for performing the aforementioned method 300.

Though exemplary embodiments have been presented in the foregoing detailed description of the invention, it should be appreciated that a vast number of variations exist. It should also be noted that the disclosed embodiments and methods are not intended to limit the scope and applicability of the invention in any way. Rather, the foregoing detailed description will provide those skilled in the art with a convenient road map for implementing an exemplary embodiment of the invention, with it being understood that various changes may be made in the methods and order of steps described in an exemplary embodiment without departing from the scope of the invention as set forth in the appended claims and their legal equivalents.

The invention claimed is:

1. A system for virtual event planning comprising:
a processor; and
a memory comprising computer-executable instructions that, when executed by the processor, cause the processor to implement:
a user interface module for generating and/or accessing a virtual event by a user, wherein the virtual event is a performance;
a virtual production facility for virtually customizing and displaying the contribution of one or more contributors and/or participants of the virtual event, wherein the virtual production facility provides the production of the virtual event comprising a virtually displayed event to an electronic device at a remote location;
an interaction module for providing a user controlled interaction between the one or more contributors and/or participants so that the user differentiates between a plurality of different levels of access that the one or more contributors and/or participants have via the electronic device from the remote location of the performance, wherein the plurality of different levels of access allow for
the selected participants to see and hear a performer of the performance in real time;
the selected participants to interact with the performer of the performance in real time;
the selected participants to interact with other selected participants having a same and/or higher level of access in real time; and
the selected participants to control the technical direction of the performance comprising camera work and special effects; and
a network connection module for establishing connection between the system and the electronic device of the one or more contributors and/or participants.

2. The system as claimed in claim 1, wherein the user interface module takes inputs from the user comprising more than one of a date, a time, a venue, a location, a budget, and a cuisine.

3. The system as claimed in claim 1, wherein the user interface module displays event plan details to the user comprising at least one of a venue, a location, an availability of venue, a cost, a suitable package, and an availability of services on a date and the location.

4. The system as claimed in claim 1, wherein the one or more contributors comprise at least one of the performer, a vendor, an event location manager, a caterer, a camera/video recording provider, an audio/music system providers, a decorator, and a driver.

5. The system as claimed in claim 1, wherein the interaction module is enabled to provide one or more medium such as tele-conferencing, webcasting, voice, and video to the one or more contributors and/or participants.

6. The system as claimed in claim 1, wherein the network connection module is further for:
providing a tour of an event location to a user through the user interface;
providing conferencing between one or more contributors of the virtual event;
interfacing with a local tourism authority system;
interfacing a real traveler positioned at the event location with a virtual traveler positioned at a remote location;
interfacing with a travel agent system to determine a guide for the event location;
reserving/booking the contributors and event venue;

interfacing with other systems for virtual and/or real-time event planning; and transmitting the event recording/listings to other participants comprising at least one of a virtual audience, a remote audience and a non-attending guest audience.

7. The system as claimed in claim 1, further comprising a payment processing module to collect payments from participants of the virtual event and to distribute payments to one or more event planners and the contributors.

\* \* \* \* \*